(12) United States Patent
Li et al.

(10) Patent No.: US 10,229,115 B2
(45) Date of Patent: Mar. 12, 2019

(54) SYSTEM AND METHOD FOR CREATING AN INTERNATIONALIZED WEB APPLICATION

(75) Inventors: Wen Bing Li, Beijing (CN); Xinsheng Mao, Beijing (CN); Li Yi, Beijing (CN); Ke Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/490,054

(22) Filed: Jun. 23, 2009

(65) Prior Publication Data

US 2009/0327866 A1    Dec. 31, 2009

(30) Foreign Application Priority Data

Jun. 27, 2008   (CN) .......................... 2008 1 0131759

(51) Int. Cl.
G06F 17/30   (2006.01)
G06F 17/28   (2006.01)
G06F 17/27   (2006.01)
G06F 17/24   (2006.01)

(52) U.S. Cl.
CPC ............. *G06F 17/30* (2013.01); *G06F 17/24* (2013.01); *G06F 17/27* (2013.01); *G06F 17/28* (2013.01)

(58) Field of Classification Search
CPC .... G06F 17/00; G06F 17/289; G06F 17/2785; G06F 17/28; G06F 17/2872; G06F 17/272; G06F 17/24
USPC ...................................... 715/234; 704/2, 277
See application file for complete search history.

(56) References Cited

U.S. PATENT DOCUMENTS

| 6,119,078 | A | 9/2000 | Kabayakawa et al. ........... 704/3 |
| 6,941,512 | B2 | 9/2005 | Cheng ........................... 715/523 |
| 7,185,276 | B2 | 2/2007 | Keswa ........................... 715/513 |
| 7,784,026 | B1 * | 8/2010 | Wong ...................... G06F 9/454 717/109 |
| 2002/0162093 | A1 * | 10/2002 | Zhou ...................... G06F 9/454 717/130 |
| 2004/0049374 | A1 * | 3/2004 | Breslau ............... G06F 17/2872 704/2 |

(Continued)

OTHER PUBLICATIONS http://developer.mozilla.org/en/docs/Using_Web_Standards_in_your_Web_Pages:Using_the_W3C_DOM.
http://www.sdi.com/en/products-index/tms.asp?ad=freetranslation&p=http%3A%2F/02Fwww%2Efreetranslation%2Ecom%2Fservices%2Fwebsite%2Dtranslation%2Ehtm&t=Translation%20Management%20Systems.
http://www.translution.com/translution-web.aspx.

*Primary Examiner* — Stephen S Hong
*Assistant Examiner* — Ahamed I Nazar
(74) *Attorney, Agent, or Firm* — Jordan IP Law, LLC (57) ABSTRACT

A method and a system for creating an internationalized Web application are provided. The method comprises loading a Web page into a browser in response to an operation of activating the browser by a user; scanning a Document Object Model (DOM) tree of the Web page to find all contents which possibly need to be translated in the Web page, and marking the contents visibly on the browser; collecting information related to contents to be translated corresponding to a direct selection made by the user in the contents which are identified as possibly needing to be translated in response to the selection; and extracting the contents to be translated from the Web page according to the collected information and storing the contents to be translated, and storing translated contents corresponding to the contents to be translated.

20 Claims, 5 Drawing Sheets

(56) References Cited

U.S. PATENT DOCUMENTS

| | | | | |
|---|---|---|---|---|
| 2004/0167784 | A1* | 8/2004 | Travieso | G06F 17/289 704/270.1 |
| 2004/0210444 | A1* | 10/2004 | Arenburg | G06F 17/275 704/277 |
| 2004/0267803 | A1* | 12/2004 | Zhou | G06F 17/2247 |
| 2006/0174196 | A1* | 8/2006 | Zhang | G06F 9/454 715/236 |
| 2007/0038982 | A1* | 2/2007 | Andrews | G06F 9/454 717/124 |
| 2008/0065982 | A1* | 3/2008 | Evanchik | G06F 3/0483 715/255 |
| 2008/0147378 | A1* | 6/2008 | Hall | G06F 17/2827 704/4 |
| 2009/0164494 | A1* | 6/2009 | Dodin | G06F 8/42 |
| 2010/0041467 | A1* | 2/2010 | St.John et al. | G07F 17/32 463/25 |
| 2011/0282644 | A1* | 11/2011 | Chin | G06F 3/0481 704/2 |

* cited by examiner

SYSTEM AND METHOD FOR CREATING AN INTERNATIONALIZED WEB APPLICATION

FIELD OF THE INVENTION

The present invention relates to a system and a method for creating an internationalized Web application, and in particular relates to a system and a method for processing a Document Object Model (DOM) by Ajax at a browser side to create an internationalized web application.

DESCRIPTION OF RELATED ART

In order to provide a Web application for users using different languages, it is necessary to provide an internationalized Web application. However, it is difficult to create an effective internationalized Web application. A conventional method for creating an internationalized Web application is as follows. Firstly, a developer goes through a static or dynamic Web page, which is based on HTML, JSP, PHP, or the like, to locate contents needing to be internationalized. Then, the developer separates the located contents from the Web page, stores the contents extracted therefrom in a property file, and modifies the Web page to add codes so as to load the property file or apply an internationalization rule to convert dates, currencies, person names, and the like. Afterwards, a translator obtains the property file, and translates the contents stored therein to contents in different languages according to a current locale. Finally, a tester checks whether corresponding translation results of the Web application are correct with respect to respective locales.

However, the following problems exist in the above conventional internationalization method.

(1) It is not easy to identify visible contents needing to be translated in a markup page. The markup language for a Web page is designed for visual rendering by a Web browser. However, the developer has to go through markups or codes to find the visible contents needing to be translated. This is not easy without visible hints, and it is difficult to ensure that no omission occurs.

(2) The translator cannot obtain enough context information to translate the property file. For example, some words or sentences may have special meanings in certain context. However, the translator cannot obtain enough context information because these words or sentences are saved discretely in the property file, resulting in poor translation quality.

(3) It is inconvenient to adjust a page layout of the translated Web page in real time. Visual experience is very important for a Web application. However, translating a text in one language into a text in another language may cause a change in text length and accordingly a change in the page layout. Therefore, the developer needs to reserve space on the Web page or adjust the layout of the Web page in advance to fit the change in text length before and after the translation; otherwise the Web page will render an inappropriate appearance after being translated. The translator can adjust the translation to avoid such a problem, but he/she can perform the adjustment only after the translation is completed. He/she cannot obtain an instant visual feedback during the translation.

(4) Translation bugs cannot be reported efficiently. When the tester checks the translated Web page and finds that some contents are missing or incorrectly translated during the test, he/she needs to create/open a bug file to report the bug. The tester has to manually input the type of the browser used, locale settings and how to reproduce the problem. The developer and the translator recreate the bug report, and determine the bug step by step according to the contents input by the tester. This process is not efficient.

In summary, the conventional internationalization method shares too little context information among the respective phases and the respective roles. Furthermore, the visual information of the Web page rendering is very important for the respective phases and the respective roles, but this information is missing in the internationalization process of the conventional method. Moreover, the translator cannot obtain the instant visual feedback about the page layout. This causes translation problems and inefficiency in the internalization process.

Therefore, there is a need for a system and a method which can create an internationalized Web application efficiently and conveniently.

SUMMARY OF THE INVENTION

The present invention is made in view of the above problems. According to various embodiments, the present invention provides a system and a method for creating an internationalized Web application which enables a developer to locate contents needing to be internationalized in a Web page easily without omission.

According to an embodiment, the present invention provides a system and a method for creating an internationalized Web application which enables a translator to obtain enough context information in the process of translation to provide an accurate translation, and to obtain an instant visual feedback to adjust a layout of a Web page at any time in the translation process.

According to an embodiment, the present invention provides a system and a method for creating an internationalized Web application which enable a tester to report found translation bugs conveniently without the need for inputting complicated information manually.

According to an embodiment, the present invention provides a system and a method for creating an internationalized Web application which maximizes the sharing of context information among respective roles in the process of the internationalization, and improves efficiency of the internationalization.

According to an aspect of the present invention, there is provided a method for creating an internationalized Web application comprising: loading a Web page into a browser in response to an operation of activating the browser by a user; scanning a Document Object Model (DOM) tree of the Web page to find all contents which possibly need to be translated in the Web page, and visibly marking the contents on the browser; collecting information related to contents to be translated corresponding to a direct selection made by the user in the contents which are identified as possibly needing to be translated in response to the selection; and extracting the contents to be translated from the Web page according to the collected information and storing the contents to be translated, and storing translated contents corresponding to the contents to be translated.

According to an aspect of the present invention, there is provided a system for creating an internationalized Web application comprising: a loading unit loading a Web page into a browser in response to an operation of activating the browser by a user; a scanning unit scanning a Document Object Model (DOM) tree of the Web page to find all contents which possibly need to be translated in the Web page, and visibly marking the contents on the browser; a collecting unit collecting information related to contents to be translated corresponding to a direct selection made by the user in the contents which are identified as possibly needing to be translated in response to the selection; and an extracting unit extracting the contents to be translated from the Web page according to the collected information and storing the contents to be translated, and storing translated contents corresponding to the contents to be translated.

The system and the method for creating an internationalized Web application according to embodiments of the present invention can improve the efficiency of the internationalization and the quality of the translation, and mainly have the following advantages.

(1) A developer can see all contents which possibly need to be translated on a Web page directly in a browser, and make annotations by in-place selections and operations so as to determine contents to be translated. This could reduce the workload required to locate the contents to be translated and minimize the possibility of missing contents.

(2) A translator can easily identify the contents to be translated which are designated by the developer in the Web page, obtain enough context information required for the translation, and translate the contents by in-place editing. Furthermore, translation results are displayed on the Web page directly in the process of the translation, thus the translator can obtain instant visual feedback information and adjust a layout of the Web page at any time. This helps the translator to improve the quality of the translation and meets requirements for the layout of the Web page.

(3) A tester can report translation bugs in place. Locale information and translation information (e.g. original contents and translated contents) related to the translation bugs will be automatically collected and submitted. When the developer and the translator open the Web page again, the bug information is attached to corresponding locations of the rendered Web page automatically. This enables the developer and the translator to locate the translation bugs and obtain their context information easily.

(4) The entire internationalization process may be completed on line in the browser without the need for switching among different roles, and the context information can be accessed in the browser directly. This improves the efficiency and the flexibility of the internationalization.

BRIEF DESCRIPTION OF THE DRAWINGS

The above and other objects, features, and advantages of the present invention will become more apparent from the detailed description of embodiments of the present invention in conjunction with the attached drawings, in which.

DETAILED DESCRIPTION OF THE INVENTION

Embodiments of the present invention will be described below with reference to the accompanying drawings. Throughout the drawings, like reference signs represent similar elements. It is to be understood that the embodiments described herein are only illustrative, and should not be construed to limit the scope of the invention.

The present invention provides a platform for creating an internationalized Web application by leveraging standard Web technologies, including Hypertext Markup Language (HTML), Document Object Model (DOM), and JavaScript to optimize the internationalization process.

The DOM is a standard defined by World Wide Web Consortium (W3C). When loading a HTML Web page to be internationalized, a browser automatically generates a DOM tree of the Web page, whose nodes include various visible contents in the HTML Web page, such as texts, currencies, dates, person names, and the like. Since the method for the browser of generating the DOM tree for the HTML Web page is well known in the art, a detailed description thereof is omitted herein for simplicity. The present invention takes advantage of the DOM tree to create the internationalized Web application in consideration of this characteristic of the DOM tree.

Figure 1:
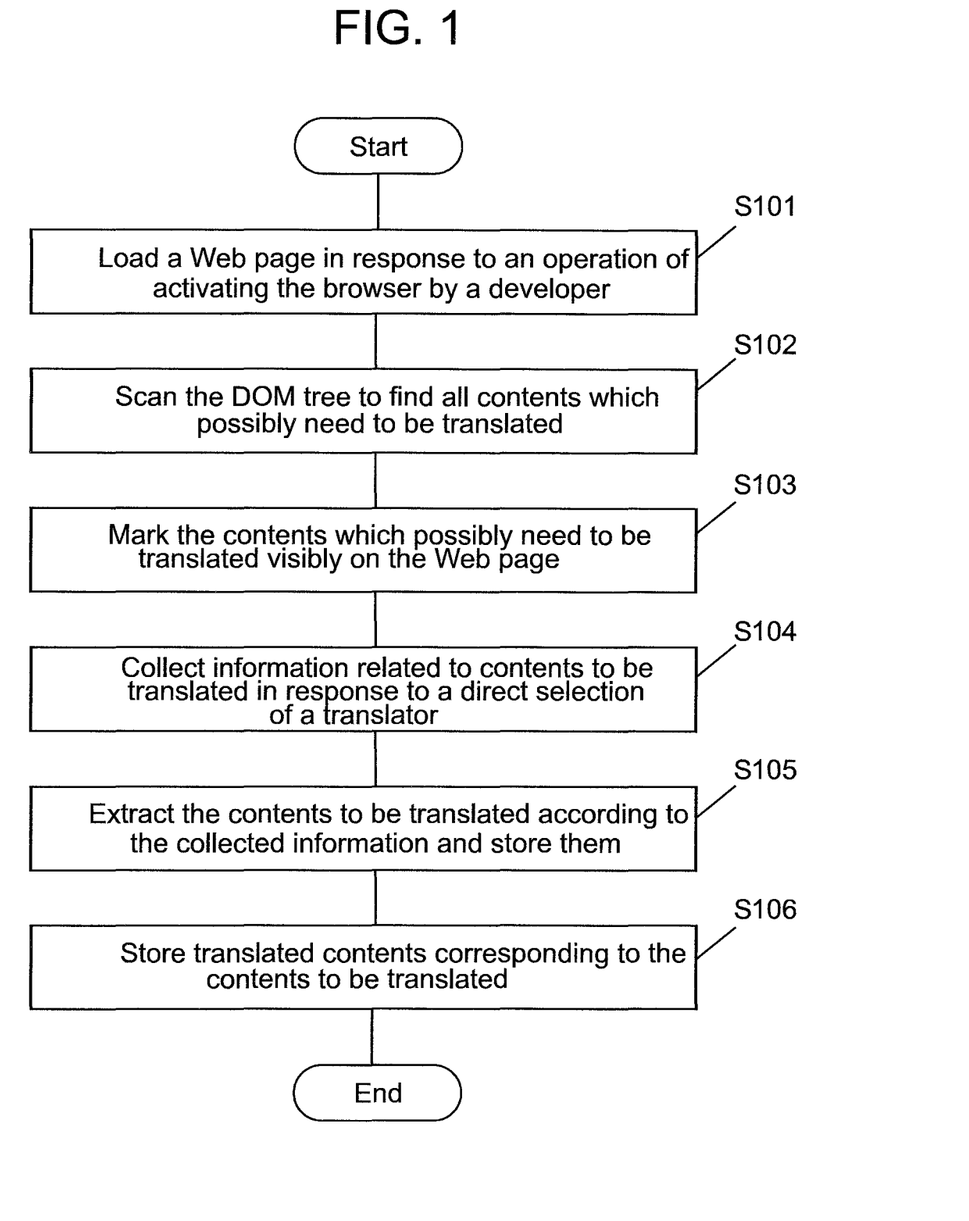
FIG. 1 is a flow diagram showing a method for creating an internationalized Web application according to an embodiment of the present invention.

A method for creating an internationalized Web application according to an embodiment of the present invention will be described below with reference to FIG. 1. FIG. 1 shows a flow diagram of the method. In the present invention, it is preferable to employ a JavaScipt library to form a client according to the embodiment of the present invention which, when being activated, performs the method for creating an internationalized Web application according to an embodiment of the present invention. For example, the JavaScript library may be preferably embedded in a browser program so that the client performs the method according to the embodiment of the present invention when the browser is activated. Alternatively, the Javascript library may also be installed onto a well-known browser as a plug-in, and the client performs the method according to the embodiment of the present invention when a user, such as a developer, a translator, or a tester, activates the plug-in.

As shown in FIG. 1, when a developer opens a Web page by activating a browser into which the JavaScript library is integrated, in step S101, the loading unit at the client reads the Web page of a Web application from a server in response to this activation operation of the developer and is loaded and displayed on the browser, and the browser generates a DOM tree for the Web page automatically. In step S102, the scanning unit at the client scans the DOM tree of the Web page to find all loaded Web page contents which possibly need to be translated, and event handlers are added onto HTML nodes corresponding to these contents to support in-place marking, i.e. in-place selections and additions of annotations, by the developer. In step S103, all of the found contents which are identified as possibly needing to be translated are visibly marked on the displayed Web page using the event handlers. As describe above, the contents which possibly need to be translated may include text, currencies, dates, person names, and the like in the Web page. For example, types of contents to which respective nodes of the DOM tree correspond can be determined according to Element Types for the nodes, and the visible contents, such as text, currencies, dates, person names, form entries, or the like, are determined as the contents which possibly need to be translated. Other well-known methods can be adopted to perform the scan. Since these methods for scanning and adding event handlers are well known in the art, the descriptions thereof are omitted herein for simplicity. Furthermore, the contents can be visibly marked by highlighting the contents or changing the colors thereof, so that the contents are easily noticed by the developer.

Since all of the contents which are identified as possibly needing to be translated on the Web page have been visibly marked, the developer may view these contents easily, and select contents to be translated from these contents identified as possibly needing to be translated by performing in-place marking on the browser. For example, the developer may click on a desired content directly on the Web page, and the event handler added onto the node corresponding to the content may present, for example, a page to the developer in response to the operation of the developer, so that the developer can confirm the performed selection or add an annotation related to the selected content to be translated through the page. The added annotation may specify a message ID of the related content, a data type, such as texts, currencies, dates, person names, or the like, or other information.

As a result of the developer's confirmation of the selection or addition of the annotation, the event handlers automatically mark the selected contents to be translated. In step S104, information related to the selected contents to be translated, such as a location, a type, a specific content, and the like of the content, is collected automatically in response to the direct selection performed by the developer through the marking in the contents which are identified as possibly needing to be translated, and the collected information is stored in a translation resource repository by invoking a locating service of the server. The collected information may be stored asynchronously in the translation resource repository by using the Asynchronous JavaScript and XML (Ajax) technology or other well-known technologies. The locating service is an interface for invoking the translation resource repository when the contents to be translated are located.

Next, in step S105, the collecting unit reads the collected information from the translation resource repository, the collecting unit extracts contents to be translated which are selected by the developer from the Web page according to the information, i.e., the contents to be translated are separated from codes of the Web page, and stores the extracted contents to be translated. Preferably, the contents to be translated are saved in a property file (a first property file) for a corresponding language; for example, if the contents to be translated are Chinese contents, they can be stored in a property file named for example "properties.cn". Furthermore, location information indicating locations of the contents to be translated in the Web page is extracted from the collected information, and is stored in a location file associated with the property file. Codes are added to the Web page for automatically loading a property file for a locale when the Web page is loaded, so that the Web page is presented to the user in a language corresponding to the locale. The codes may be preset by a system or selected by the user according to the locale.

Subsequently, in step S106, after a translator acquires the first property file using a conventional method, and translates the contents to be translated which are stored therein manually or by other well-known methods, for example machine translation, the translated contents thus obtained are stored. Preferably, the translated contents are saved in a property file (a second property file) for a corresponding language. For example, if the translated contents are English contents, the extracted translated contents may be saved in a property file named for example "properties.en". Then, the internationalization process for the Web page is terminated.

In order to make the Web page available for multiple locales, the translator may create one property file for each of the locales, and store the translated contents in a language corresponding to the locale in the property file. Furthermore, the location information of the translated contents associated with the property files is also stored, so that when users in different locales open the Web page, the codes added into the Web page as described above render the browser to automatically select and load property files in corresponding languages according to the locales of the users, thereby presenting the Web page to users in their languages.

As described above, in the process of locating the contents to be translated, all of the contents which are identified as possibly needing to be translated in the Web page are visibly marked on the Web page, and the developer may select in place the contents to be translated by making marks, such as by directly clicking, adding annotations, or the like, on the Web page, so that all of the contents to be translated may be determined easily without omission.

However, in the above step S106, when the translator translates the contents to be translated which are stored in the first property file, the problem that the translator cannot obtain enough context information and cannot obtain an instant visual feedback still exists. To this end, a flow shown in FIG. 2 may be adopted to improve step S106 shown in FIG. 1.

Figure 2:
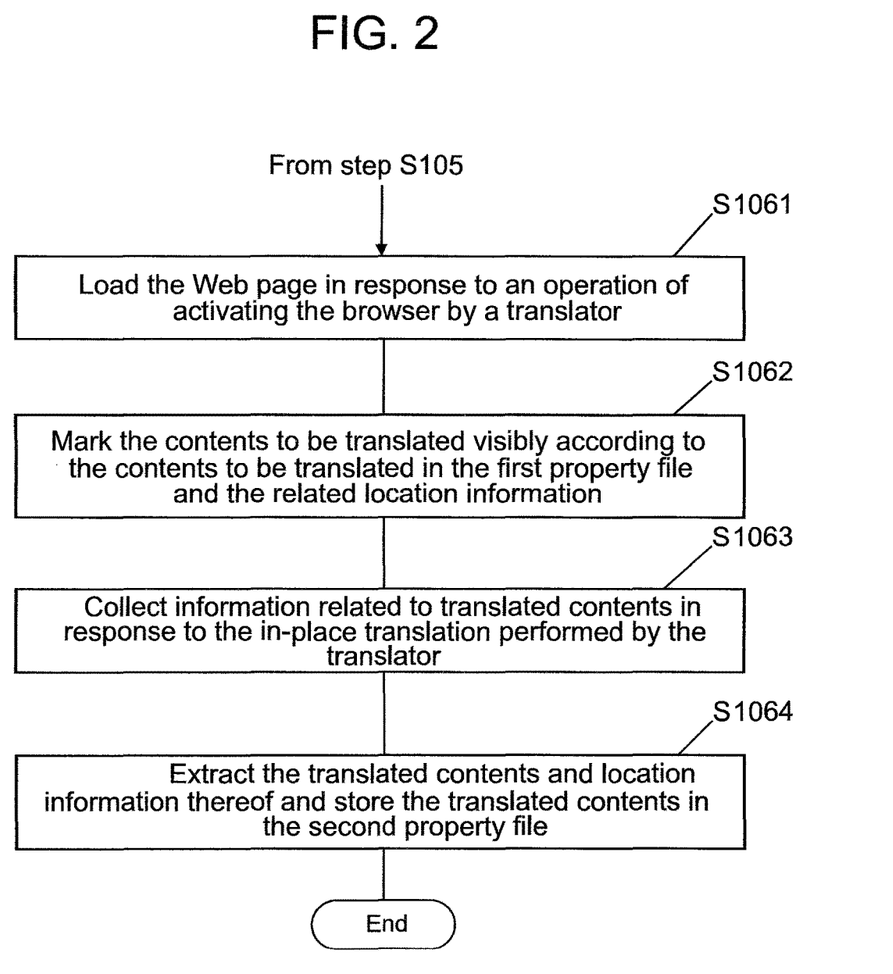
FIG. 2 is a flow diagram showing a variation of step S106 shown in FIG. 1.

As shown in FIG. 2, the translator opens the Web page again by activating the browser in which the client according to the embodiment of the present invention is integrated, in step S1061. The codes of the Web page are read in response to the activation operation, and a corresponding property file (which is assumed to be the first property file hereinafter) and a location file in a property file repository are read according to the locale (which was preset by the system or selected by the translator). Then the Web page is loaded into the browser which generates the DOM tree of the Web page automatically.

In step S1062, the contents to be translated are visibly marked on the displayed Web page according to the contents to be translated which are stored in the first property file and the location information of the contents to be translated which are stored in the location file, for example, the DOM tree may be scanned, and the contents to be translated are found and visibly marked according to the contents to be translated which are stored in the property file and the location information of the contents to be translated which are stored in the location file. Furthermore, event handlers capable of responding to the translator's operations on corresponding nodes on the DOM tree are added to the nodes to support the in-place editing of the translator.

Since the contents to be translated have been marked explicitly, the translator is able to find these contents in the Web page easily. Then, the translator edits the contents to be translated in place, for example, by directly clicking on these contents, so as to replace them with contents in another language corresponding to the current locale. As described above, this in-place editing is achieved by responses of the added event handlers. After the translation is completed, the contents to be translated in the original language on the Web page are replaced with translated contents in the language corresponding to the locale preset by the system or selected by the translator.

In step S1063, information related to the translated contents, such as locations, types, specific contents, and the like of the translated contents, is automatically collected in response to the in-place translation performed by the translator on the browser, and the collected information is saved in the translation resource repository by, for example, the Ajax technology via a translation service. The translation service is an interface for invoking the translation resource repository in the translation.

Next, in step S1064, this collected information is read from the translation resource repository, the corresponding translated contents are extracted from the Web page according to the information, and the extracted translated contents are saved in a property file (the second property file) for the corresponding language. Location information indicating locations of the translated contents in the Web page is also extracted from the collected information, and is stored in a location file associated with the second property file. The second property file and the location file are stored in the property file repository. Then, the internationalization process is terminated.

The translator can create one property file for each locale by the method described above, and store the translated contents in a corresponding language in the property file. Additionally, the location information of the translated contents associated with the property file is also saved. When the Web page is loaded, the codes added into the Web page render the browser to load automatically a property file in a corresponding language according a locale selected by the user, so that the Web page in the language corresponding to the locale is presented to the user.

It can be seen that, because the translator performs translation in place on the Web page and the translated contents are displayed on the Web page in real time, the translator can obtain enough context information during the translation to thereby improve the quality of translation, and can obtain an instant visual feedback to thereby avoid an undesired change of the layout of the Web page caused by a variation in text length.

As described above, the contents to be translated in the Web page are translated into contents in multiple languages and the translated contents are stored in corresponding property files, so that a property file corresponding to a locale of a user is automatically loaded when the Web page is opened, thereby realizing the internationalization of the Web page. However, it is usually required to test the translated contents by a tester to find translation bugs therein in the process of the internationalization, so they can be fixed to prevent the bugs from existing in the translated contents. Conventionally, the tester checks the translated contents, and inputs information related to the translation bugs manually after finding the translation bugs, resulting in poor efficiency. A method for creating an internationalized Web page according to another embodiment of the present invention may be adopted to solve this problem.

Figures 3, 3A:
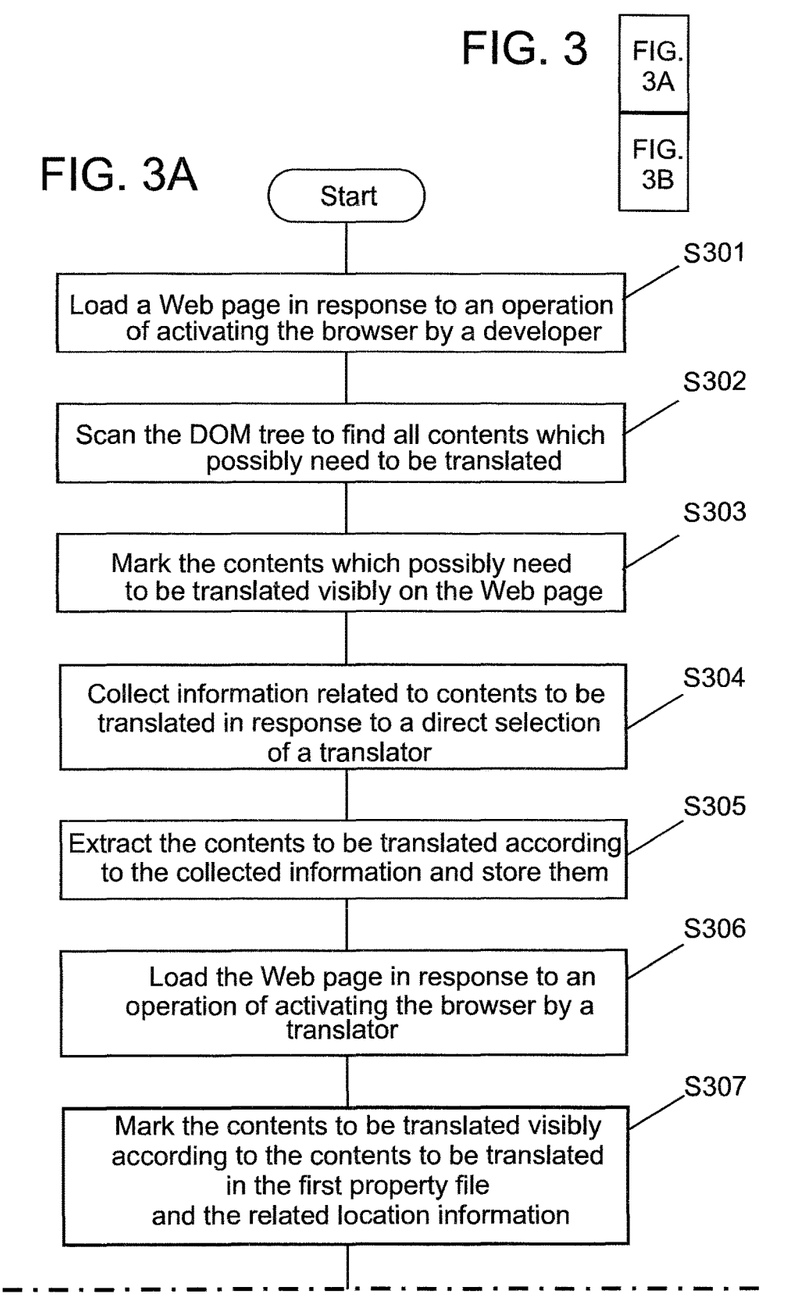
FIG. 3 is a flow diagram showing a method for creating an internationalized Web application according to another embodiment of the present invention.
Figure 3B:
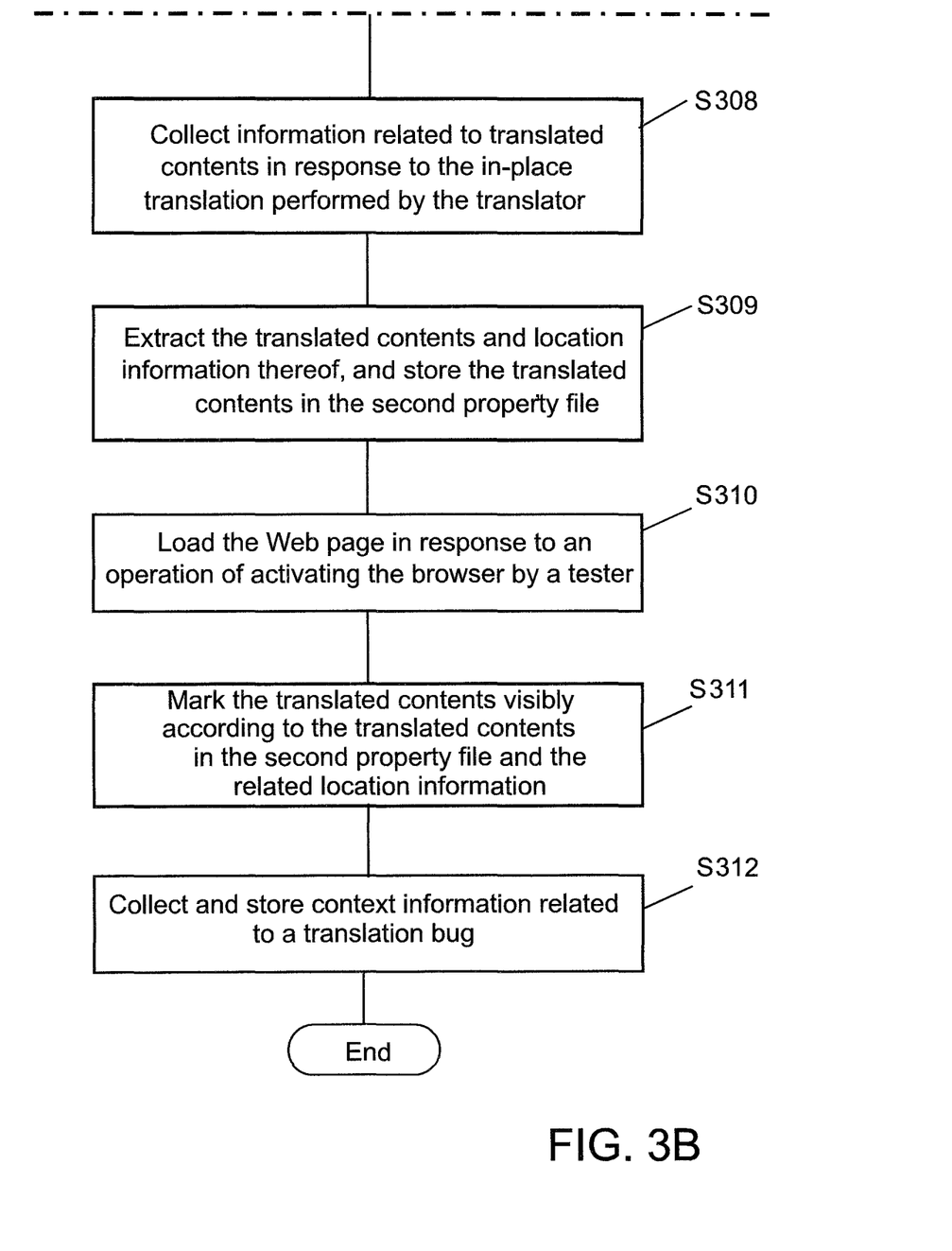

FIG. 3 shows a flow diagram of a method for creating an internationalized Web page according to another embodiment of the present invention. Steps S301 to S309 in FIG. 3 are the same as steps S101 to S105 shown in FIG. 1 and steps S1061 to S1064 shown in FIG. 2 respectively, thus the descriptions of the same steps are omitted for simplicity.

As shown in FIG. 3, a tester opens the Web page by activating a browser in which the client according to the embodiment of the present invention is integrated, in step S310. The codes of the Web page are read in response to the activation operation, and a property file (assumed to be the second property file hereinafter) and a location file corresponding to a locale preset by the system or selected by the tester in the property file repository are read according to the locale, so that the translated Web page is loaded onto the browser which generates a DOM tree of the Web page automatically. In step S311, translated contents are visibly marked on the Web page according to the translated contents in the second property file and location information in the location file. For example, the DOM tree may be scanned, and the translated contents may be found and visibly marked according to the translated contents in the second property file and the location information in the location file. Furthermore, event handlers capable of responding to operations (e.g. direct clicks) performed by a user (e.g. the tester) on corresponding nodes of the DOM tree are also added to the nodes to support an in-place report of the tester. At this time, the displayed Web page is an internationalized Web page suitable for the locale.

The tester checks the visibly marked contents in the Web page. When finding a translation bug, such as a misspelled word or a wrongly translated sentence, the tester may point out the translation bug by, for example, directly clicking on the content or adding comments on the content. In response to this input from the tester, in step S312, context information related to the translation bug pointed out by the input, such as a type and version of the used browser, the current locale, the added comments, a location of the translation bug, corresponding translated contents and original contents, and the like, is automatically collected. The collected information is saved by using, for example, the Ajax technology via a test service in a bug repository as a bug file. Then, the internationalization process is terminated. The test service is an interface for invoking the bug repository during the test.

After the test is completed, when the developer or the translator loads the Web page again by activating the browser, the bug file is read from the bug repository, the codes are read from the Web page and the corresponding property file according to the current locale is read from the property file repository to load the Web page in the corresponding language, and the reported translation bug is visibly marked on the Web page by scanning the DOM tree of the Web page and according to information therein, so that the developer or the translator can notice the translation bugs easily. The developer and the translator may obtain more information about the translation bug, such as contents before and after the translation to which the translation bug corresponds, the comments added by the tester, etc., by directly clicking on the translation bug. The function described above can be achieved by adding the above event handler capable of responding to the operation of the user or utilizing other well-known technologies.

It can be seen that, since the information related to the translation bug is collected automatically without the need for the manual input of the tester when the translation bug is found, and the developer and the translator can reproduce the translation bug easily through the collected information, the efficiency of the internationalization is improved.

Figure 4:
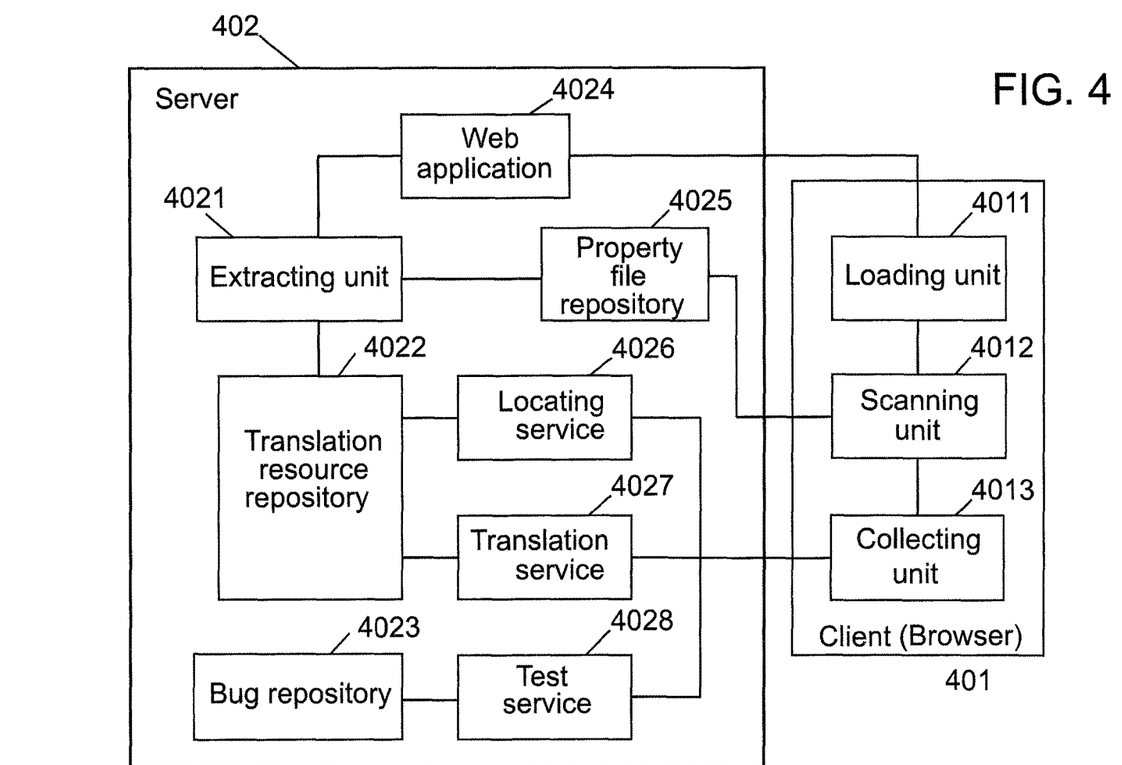
FIG. 4 is a block diagram showing a system for creating an internationalized Web application according to an embodiment of the present invention.

Hereinafter, a system for creating an internationalized Web application according to an embodiment of the present invention will be described with reference to FIG. 4. FIG. 4 shows a block diagram of the system.

As shown in FIG. 4, the system for creating an internationalized Web application according to the embodiment of the present invention includes a client 401 and a server 402. The client 401 includes a loading unit 4011, a scanning unit 4012 and a collecting unit 4013. The client 401 can be implemented by hardware, software, or a combination thereof, such as a processor executing application code. In the present invention, as described above, it is preferable to implement the client 401 with a JavaScript library. For example, the JavaScript library for implementing functions of the client 401 can be preferably embedded into a program of a browser, so that the client 401 is activated while the browser is activated, as described later. Alternatively, the JavaScript library for implementing the functions of the client 401 can be installed onto a well-known browser as a plug-in, and the client 401 is activated according to an operation of a user (e.g. a developer, a translator, or a tester).

The client 401 interacts with the server 402. The server 402 includes an extracting unit 4021, a translation resource repository 4022, a bug repository 4023, a Web application 4024, a property file repository 4025, a locating service 4026, a translation service 4027, and a test service 4028. The locating service 4026 and the translation service 4027 are interfaces for invoking the translation resource repository 4022 by the collecting unit 4013, and the test service 4028 is an interface for invoking the bug repository 4023 by the collecting unit 4013. The translation resource repository 4022 is used to store information collected by the collecting unit 4013. The extracting unit 4021 is used to extract contents to be translated and location information thereof from a Web page of the Web application 4024 according to the information stored in the translation resource repository 4022, and to save the contents in a corresponding property file. The extracting unit 4021 also stores translated contents in a corresponding property file in response to the user's translation for the contents to be translated.

The property file repository 4025 is used to store the property files and the location information. The bug repository 4023 is used to store information related to a translation bug found in a test.

The loading unit 4011, the scanning unit 4012, and the collecting unit 4013 will be described in detail below. Firstly, the units will be described in conjunction with a phase of locating the content to be translated in the Web page.

When a developer opens the Web page by activating the browser in which the client 401 according to the embodiment of the present invention is integrated, the client 401 is activated at the same time. The loading unit 4011 reads the Web page of the Web application 4024 from the server 402 in response to the operation of activating the browser by the developer, and loads and displays it on the browser. At this time, the browser generates a DOM tree of the loaded Web page automatically, and some nodes of the DOM tree include visible content of the loaded Web page, such as texts or the like.

The scanning unit 4012 scans the DOM tree to find all contents meet a criteria for possibly needing to be translated in the loaded Web page, and adds event handlers on nodes corresponding to these contents to support in-place marking, i.e., in-place selections and additions of annotations, performed by the developer. The contents which are identified as possibly needing to be translated include texts, currencies, dates, person names, and the like in the Web page. For example, the scanning unit 4012 may determine types of contents corresponding to respective nodes of the DOM tree according to Element Types of the nodes, and determine visible contents including texts, currencies, dates, person names, form entries, or the like as the contents which possibly need to be translated. Since the method for scanning and adding event handlers is well-known in the art, descriptions thereof are omitted herein for simplicity. After completing the scan, the scanning unit 4012 visibly marks the found contents which are identified as possibly needing to be translated on the displayed Web page. For example, the contents can be visibly marked by highlighting the contents or changing colors thereof, so that the contents are easily noticed by the developer.

The developer views all of the contents which are identified as possibly needing to be translated on the Web page, and selects contents which actually need to be translated, i.e., the contents to be translated, thereamong by in-place marking on the Web page. For example, the developer may click on a desired content directly on the Web page, at this time, the event handler added onto the node corresponding to the content presents for example a page to the developer in response to this in-place selection operation (i.e., the operation performed by the user on the node) to enable the developer to confirm the performed selection or add annotations related to the selected content to be translated through the page. After the developer performs marking, i.e. confirms the selections or adds the annotations, the scanning unit 4012 visibly marks the selected contents to be translated on the Web page.

The collecting unit 4013 automatically collects information related to the selected contents to be translated, such as locations, types, and specific contents of the contents to be translated, the added annotations, and the like, in response to the direct selections performed by the developer in the contents which are identified as possibly needing to be translated by marking. The collecting unit 4013 stores the collected information in the translation resource repository 4022 of the server 402 by invoking the locating service 4026 of the server 402. For example, the collecting unit 4013 may communicate with the backend by the Ajax technology, so that the collected information is stored asynchronously in the translation resource repository 4022.

As described above, the extracting unit 4021 of the server 402 reads the collected information from the translation resource repository 4022, extracts the contents to be translated which are selected by the developer from the Web page according to the information, i.e., separates the contents to be translated from codes of the Web page, and saves the extracted contents to be translated preferably in an original property file (referred to as a first property file hereinafter) for a corresponding language. The extracting unit 4021 also extracts the location information indicating locations of the contents to be translated in the original Web page from the collected information, and stores the location information in a location file associated with the property file. The property file and the location file are stored in the property file repository 4025. The format of the property file and the method for extracting the contents to be translated and the location information thereof by the extracting unit 4021 are well known in the art, and thus descriptions thereof are omitted herein for simplicity. Furthermore, the extracting unit 4012 also adds into the codes of the Web page codes for automatically loading a property file for a locale preset by a system or selected by a user according to the locale when the Web page is loaded. After a translator obtains the first property file by a conventional method and translates the contents to be translated which are stored therein, either manually or by using other well-known methods such as machine translation as described above, the extracting unit 4021 further stores the translated contents thus obtained. For example, the extracting unit 4021 stores the translated contents, preferably in a second property file for the corresponding language.

However, in order to enable the translator to obtain context information of the contents to be translated and an instant feedback about a layout of the page during the translation, the loading unit 4011, the scanning unit 4012, and the collecting unit 4013 according to an embodiment of the invention may perform the following operations when the translator is translating.

When the translator opens the Web page by activating a browser in which the client 401 according to the embodiment of the present invention is integrated, the loading unit 4011 reads the codes of the Web page, reads a corresponding property file (assumed to be the first property file hereinafter) and a location file in the property file repository 4025 according to a locale preset by the system or selected by the translator, and then loads the Web page on the browser which generates a DOM tree of the Web page automatically. The scanning unit 4012 marks the contents to be translated visibly on the displayed Web page according to the contents to be translated which are stored in the first property file and the location information of the contents to be translated which is stored in the location file. For example, the scanning unit 4012 may scan the DOM tree, and find and mark visibly the contents to be translated according to the contents to be translated which are stored in the property file and the location information of the contents to be translated which is stored in the location file. Furthermore, event handlers capable of responding to operations (e.g. clicking) of the translator on corresponding nodes of the DOM tree are added on the nodes to support the in-place editing of the translator.

Since the contents to be translated have been marked explicitly, the translator is able to find these contents in the Web page easily. Then, the translator edits the contents to be translated in place by, for example, directly clicking on these contents, so as to replace them with contents in another language corresponding to the current locale. As described above, this in-place editing is achieved by responses of the added event handlers. During the translation, the contents to be translated are displayed on the Web page in real time, thus the translator can obtain enough context information for accurate translation. Furthermore, the translator can further obtain instantly the visual feedback about the changes in the lengths of the contents before and after the translation or the like since the translated contents are also displayed on the Web page in real time, so that the layout of the page can be adjusted according to this feedback at any time. After the translation is completed, the contents to be translated in the original language on the Web page are replaced with the translated contents in a language corresponding to the locale preset by the system or selected by the translator.

The collecting unit 4013 automatically collects information related to the translated contents, such as locations, types, and specific contents of the translated contents, and the like, in response to in-place translation performed by the translator on the browser, and saves the collected information in the translation resource repository 4022 by using, for example, the Ajax technology via the translation service 4027.

Similarly, the extracting unit 4021 extracts the translated contents from the Web page according to the collected information, and preferably saves them in a property file (referred to as the second property file hereinafter) for a corresponding language. The extracting unit 4021 also extracts location information indicating locations of the translated contents in the internationalized Web page from the collected information, and stores the location information in a location file associated with the property file. The property file and the location file are stored in the property file repository 4025.

As described above, the translated contents are preferably tested to reduce translation bugs. The loading unit 4011, the scanning unit 4012, and the collecting unit 4013 perform the following operations in the test phase.

When a tester opens the Web page by activating a browser in which the client 401 according to the embodiment of the present invention is integrated, the loading unit 4011 reads the codes of the Web page, reads a property file (assumed to be the second property file hereinafter) and a location file corresponding to a locale preset by the system or selected by the tester in the property file repository 4025 according to the locale, and thus loads the translated Web page on the browser. At this time, the browser generates the DOM tree of the Web page automatically. The scanning unit 4012 visibly marks the translated contents on the Web page according to the translated contents in the second property file and the location information in the location file. For example, the scanning unit 4012 may scan the DOM tree, and find and visibly mark the translated contents according to the translated contents in the second property file and the location information in the location file. Furthermore, the scanning unit 4012 adds event handlers capable of responding to operations performed by the tester on nodes of the DOM tree corresponding to those operations to support an in-place report of a translation bug by the tester.

Since the translated contents have been observably marked, the tester is able to find and check these contents in the Web page. When the tester finds a translation bug, e.g. a misspelled word or a wrongly translated sentence, the tester may point out the translation bug by for example directly clicking on the content or adding comments on the content. At this time, the collecting unit 4013 automatically collects context information related to the translation bug pointed out by the tester, such as a type and a version of the used browser, the current locale, the added comments, a location of the translation bug, corresponding translated contents and original contents, and the like, and saves the collected information in the bug repository 4023 as a bug file by using, for example, the Ajax technology via the test service 4028.

After the test is completed, when the developer or the translator loads the Web page again by activating the browser, besides reading the codes of the Web page and the corresponding property file according to the current locale to load the corresponding internationalized Web page, the scanning unit 4012 reads the bug file from the bug repository 4023 since the bug file for reporting the translation bug is present in the bug repository 4023 at this time. The scanning unit locates and visibly marks the translation bug reported by the tester on the Web page by scanning the DOM tree of the Web page and according to the information recorded therein, so that the developer or the translator can notice the translation bug easily. The developer and the translator can obtain more information about the translation bug, such as the comments added by the tester and the like, by directly clicking on the marked translation bug on the Web page. This may be achieved by adding the event handler capable of responding to the operation of the user as described above or by other well-known technologies.

It is to be noted that, although the translation resource repository 4022 and the property file repository 4025 are used to store the collected information, and the property files and the location files respectively hereinbefore, this is not limitative, and the information and the files can be stored separately or together at any location as required. Furthermore, although the system according to the embodiment of the present invention is described to employ an architecture of a client and a server herein, this is only exemplary, and the system may be implemented by a stand-alone architecture.

It is further to be appreciated that, when the tester tests the translated contents, the scanning unit 4012 may either only load the translated contents, or load the translated contents and the original contents corresponding to the translated contents simultaneously, so that the tester may find translation bugs more easily by comparison.

The method and the system for creating an internationalized Web page according to the embodiments of the present invention have been described above. By utilizing the method and the system, a developer can select contents to be translated in place on a Web page, thereby avoiding omission. Also, a translator can obtain context information of the contents to be translated and an instant feedback about a layout of the page during the translation, thereby improving the quality of translation and avoiding any undesired change of the layout caused by the translation. A tester can report translation bugs in place without the need for manually inputting a large amount of information during the test, thereby improving the test efficiency. Moreover, the method and the system for creating an internationalized Web application according to the embodiments of the present invention can improve the internationalization efficiency significantly by associating the developer, the translator, and the tester more closely and sharing context information as much as possible among the three roles. Furthermore, it is appreciated that the method and the system for creating an internationalized Web page of the present invention can also be applied to the internationalization of a dynamically generated Web page by the DOM process.

Alternative embodiments of the present invention may further comprise compute readable codes on a computer readable medium. The computer readable medium may include a computer readable recording medium. The computer readable recording medium is any data storage apparatus that can store data readable by a computer system. Examples of the computer readable recording medium include a magnetic storage medium, such as a read-only memory (ROM), a random-access memory (RAM), a CD-ROM, a magnetic tape, a floppy disk and a hard disk, and an optical storage apparatus, such as a CD (compact disk) and a DVD (digital versatile disk). The computer readable recording medium may also be distributed in network-coupled computer systems so that the computer readable codes are stored and executed in a distributed way. Furthermore, programmers in the art to which the present invention pertains can easily construe a functional program, a code and a code segment for implementing the present invention.

Although particular embodiments of the present invention have been shown and described, it is to be understood by those skilled in the art that various changes in form and details can be made to the embodiments without departing from the scope and spirit of the present invention as defined in the following claims and equivalents thereof.

What is claimed is:

1. A method for creating an internationalized Web application, comprising:
   loading a Hypertext Markup Language (HTML) Web page into a Web browser in response to an operation of activating the Web browser by a user;
   automatically scanning a Document Object Model (DOM) tree of the HTML Web page to find unmarked contents in the HTML Web page loaded into the Web browser which meet a predefined criteria that indicates a candidate for translation in the HTML Web page loaded into the Web browser;
   automatically forming visibly marked contents by visually marking the unmarked contents which meet the predefined criteria on the HTML Web page loaded into the Web browser and displayed to the user via the Web browser in response to finding the unmarked contents in the HTML Web page via scanning the DOM tree;
   collecting information related to selected contents to be translated corresponding to a selection made by the user from the visibly marked contents on the HTML Web page loaded into the Web browser and displayed to the user via the Web browser;
   extracting the selected contents to be translated from the HTML Web page loaded into the Web browser and displayed to the user via the Web browser according to the collected information and storing the selected contents to be translated; and
   storing translated contents corresponding to the selected contents to be translated, wherein the translated contents are generated and stored by:
      editing in place, via a clicking operation without displaying to the user the DOM tree or source code corresponding to the HTML web page loaded into the Web browser made on the selected contents to be translated that is made directly by the user on the HTML Web page loaded into the Web browser and displayed to the user via the Web browser, to replace the selected contents with corresponding contents in a different language to form the translated contents; and
      extracting the translated contents to store the translated contents.

2. The method according to claim 1, further comprising:
   separating the selected contents from codes of the HTML Web page, wherein the codes are used to identify a locale where the HTML Web page is loaded; and
   extracting location information of the selected contents to be translated, wherein the location information indicates a location of the selected contents in the HTML Web page.

3. The method according to claim 2, wherein the selected contents to be translated are stored in a first property file for a corresponding language, wherein the translated contents are stored in a second property file, and wherein the translated contents are obtained and stored by:
   loading the HTML Web page again into the Web browser in response to an operation of activating the browser by a translator;
   automatically scanning a DOM tree of the HTML Web page loaded again into the Web browser and displayed to the translator via the Web browser;
   automatically marking one or more unmarked contents to be translated visually on the HTML Web page loaded again into the Web browser and displayed to the translator via the Web browser based on the selected contents to be translated that are read from the first property file and the location information to form one or more visibly marked contents to be translated;
   editing in place, via a clicking operation by the translator on the one or more visibly marked contents to be translated, to replace the one or more visibly marked contents with corresponding contents in a different language to form the translated contents;
   collecting information related to the translated contents;
   extracting the translated contents and location information thereof from the HTML Web page loaded again into the Web browser and displayed to the translator via the Web browser according to the collected information; and
   storing the translated contents in the second property file.

4. The method according to claim 3, further comprising:
   loading the HTML Web page an additional time into the Web browser using the second property file in response to an operation of activating the browser by a tester;

automatically scanning a DOM tree of the HTML Web page loaded the additional time into the Web browser and displayed to the tester via the Web browser;

automatically marking, in response to loading the HTML Web page the additional time into the Web browser that is displayed to the tester via the Web browser, the translated contents visually on the HTML Web page loaded the additional time into the Web browser and displayed via the Web browser based on the translated contents read from the second property file and the location information thereof to form one or more visibly marked translated contents;

identifying in place, by a selection made by the tester of one or more visibly marked translated contents on the HTML Web page loaded the additional time into the Web browser and displayed to the tester via the Web browser, a translation bug corresponding to the translated contents;

collecting context information related to the translation; and storing the context information in a bug file.

5. The method according to claim 4, wherein the context information comprises one or more of the used Web browser and its version, a current locale, comments added by the user, or translated contents and original contents thereof to which the translation bug corresponds.

6. The method according to claim 1, further comprising adding an event handler onto a DOM node, wherein the event handler is capable of responding to the user performing an operation on the HTML Web page loaded into the Web browser and displayed to the user via the Web browser that corresponds to the DOM node.

7. The method according to claim 6, further comprising one or more of:

confirming the selection made by the user in response to the clicking operation on the HTML Web page loaded into the Web browser and displayed to the user via the Web browser; or adding an annotation made by the user in response to the clicking operation on the HTML Web page loaded into the Web browser and displayed to the user via the Web browser.

8. The method according to claim 1, wherein the information related to the selected contents to be translated comprises one or more of locations, types, or specific contents of the selected contents to be translated.

9. A system for creating an internationalized Web application, comprising:

a processor executing application code, the application code comprising:

a loading unit to load a Hypertext Markup Language (HTML) Web page into a Web browser in response to an operation of activating the Web browser by a user;

a scanning unit to:

automatically scan a Document Object Model (DOM) tree of the HTML Web page to find unmarked contents in the HTML Web page loaded into the Web browser which meet a predefined criteria that indicates a candidate for translation in the HTML Web page loaded into the Web browser; and automatically form visibly marked contents by visually marking the unmarked contents which meet the predefined criteria visibly on the HTML Web page loaded into the Web browser and displayed to the user via the Web browser in response to finding the unmarked contents in the HTML Web page via scanning the DOM tree;

a collecting unit to collect information related to selected contents to be translated corresponding to a selection made by the user from the visibly marked contents on the HTML Web page loaded into the Web browser and displayed to the user via the Web browser;

an extracting unit to extract the selected contents to be translated from the HTML Web page loaded into the Web browser and displayed via the Web browser to the user according to the collected information and to store the selected contents to be translated;

a translator to edit in place, via a clicking operation without displaying to the user the DOM tree or source code corresponding to the HTML web page loaded into the Web browser made on the selected contents to be translated that is made directly by the user on the HTML Web page loaded into the Web browser and displayed to the user via the Web browser, to replace the selected contents with corresponding contents in a different language to form the translated contents; and a storing unit to store the translated contents corresponding to the selected contents to be translated.

10. The system according to claim 9, wherein the extracting unit is to:

store the selected contents to be translated in a first property file for a corresponding language; and store the translated contents in a second property file.

11. The system according to claim 10, wherein the extracting unit is to:

separate the selected contents from codes of the HTML Web page, wherein the codes are to be used to identify a locale where the HTML Web page is loaded; and extract location information of the selected contents to be translated, wherein the location information indicates a location of the selected contents in the HTML Web page.

12. The system according to claim 11, further including:

the loading unit to load the HTML Web page again into the Web browser in response to an operation of activating the browser by a translator;

the scanning unit to:

automatically scan a DOM tree of the HTML Web page loaded again into the Web browser and displayed to the translator via the Web browser; and automatically mark one or more unmarked contents to be translated visually on the HTML Web page loaded again into the Web browser and displayed to the translator via the Web browser based on the selected contents to be translated that are read from the first property file and the location information to form one or more visibly marked contents to be translated;

the translator to edit in place, via a clicking operation by the translator on the one or more visibly marked contents to be translated, to replace the one or more visibly marked contents with corresponding contents in a different language to form the translated contents;

the collecting unit to collect information related to the translated contents;

the extracting unit to extract the translated contents and location information thereof from the HTML Web page loaded again into the Web browser and displayed via the Web browser to the translator according to the collected information; and the storing unit to store the translated contents in the second property file.

13. The system according to claim 9, further including:
the loading unit to load the HTML Web page an additional time into the Web browser using the second property file in response to an operation of activating the browser by a tester;
the scanning unit to:
   automatically scan a DOM tree of the HTML Web page loaded the additional time into the Web browser and displayed to the tester via the Web browser; and
   automatically mark, in response to loading the HTML Web page the additional time into the Web browser that is displayed via the Web browser to the tester, the translated contents visually on the HTML Web page loaded the additional time into the Web browser and displayed via the Web browser based on the translated contents read from the second property file and the location information thereof to form one or more visibly marked translated contents;
the collecting unit to collect context information related to a translation bug identified in place, by a selection made by the tester of one or more visibly marked translated contents on the HTML Web page loaded the additional time into the Web browser and displayed to the tester via the Web browser, a translation bug corresponding to the translated contents; and
the storing unit to store the context information in a bug file.

14. The system according to claim 13, wherein the scanning unit is to display original contents of the translated contents visually on the Web browser together with the translated contents.

15. The system according to claim 13, wherein the context information comprises one or more of the used browser and its version, a current locale, comments added by the user, or translated contents and original contents thereof to which the translation bug corresponds.

16. The system according to claim 9, wherein the scanning unit is to respond to an operation performed by the user on the HTML Web page loaded into the Web browser and displayed to the user via the Web browser that corresponds to a DOM node of the DOM tree including an event handler that is added onto the DOM.

17. The system according to claim 9, wherein the user is allowed to confirm the selection in response to the clicking operation or is allowed to add an annotation in response to the clicking operation.

18. The system according to claim 9, wherein the information related to the selected contents to be translated comprises one or more of locations, types, or specific contents of the selected contents to be translated.

19. The method according to claim 1, wherein the predefined criteria comprises one or more of currencies or names, and wherein the method further comprises creating a property file for each locale where the HTML Web page is loaded into the Web browser.

20. The method according to claim 1, wherein automatically scanning the DOM tree to find the unmarked contents includes:
   identifying a type of content to which a respective DOM node of the DOM tree corresponds based on an ElementType for the respective DOM node; and
   identifying, as the unmarked contents, visible contents on the HTML Web page loaded into the Web browser and displayed to the user via the Web browser corresponding to the respective DOM node.

* * * * *